United States Patent [19]

Gismondi et al.

[11] Patent Number: 5,016,153
[45] Date of Patent: May 14, 1991

[54] ARTICULATED ARM LAMP

[75] Inventors: Ernesto Gismondi, Milan, Italy; John T. Bissell, Los Angeles, Calif.

[73] Assignee: Artemide S.p.A., Milan, Italy

[21] Appl. No.: 353,109

[22] Filed: May 17, 1989

[30] Foreign Application Priority Data

May 20, 1988 [IT] Italy .................. 20679 A/88

[51] Int. Cl.[5] .................... F21V 21/18; F21S 1/12
[52] U.S. Cl. .................... 362/402; 362/287; 362/413; 362/414
[58] Field of Search .............. 362/285, 288, 401, 402, 362/410, 413, 414, 387, 287

[56] References Cited

U.S. PATENT DOCUMENTS

| 3,543,019 | 11/1970 | Jacobsen | 362/402 |
| 4,165,530 | 8/1979 | Sowden | 362/413 X |
| 4,213,172 | 7/1980 | Scattolin et al. | 362/413 |
| 4,494,177 | 1/1985 | Matthews | 362/413 X |
| 4,770,384 | 9/1988 | Kuwazino et al. | 362/402 X |
| 4,772,993 | 9/1988 | Engel | 362/419 |
| 4,802,074 | 1/1989 | Puschkarski | 362/287 |

FOREIGN PATENT DOCUMENTS 995170 6/1965 United Kingdom .............. 362/402

*Primary Examiner*—Stephen F. Husar
*Assistant Examiner*—Peggy Neils
*Attorney, Agent, or Firm*—Herbert Dubno

[57] ABSTRACT

This articulated arm lamp comprises a base for supporting first and second mutually articulated arms; the second arm furthermore supports, at one end, a paraboloid which contains a light source; first and second arms are supported by a flexible element which is also simultaneously adapted to conduct electric current from the base to the light source.

17 Claims, 2 Drawing Sheets

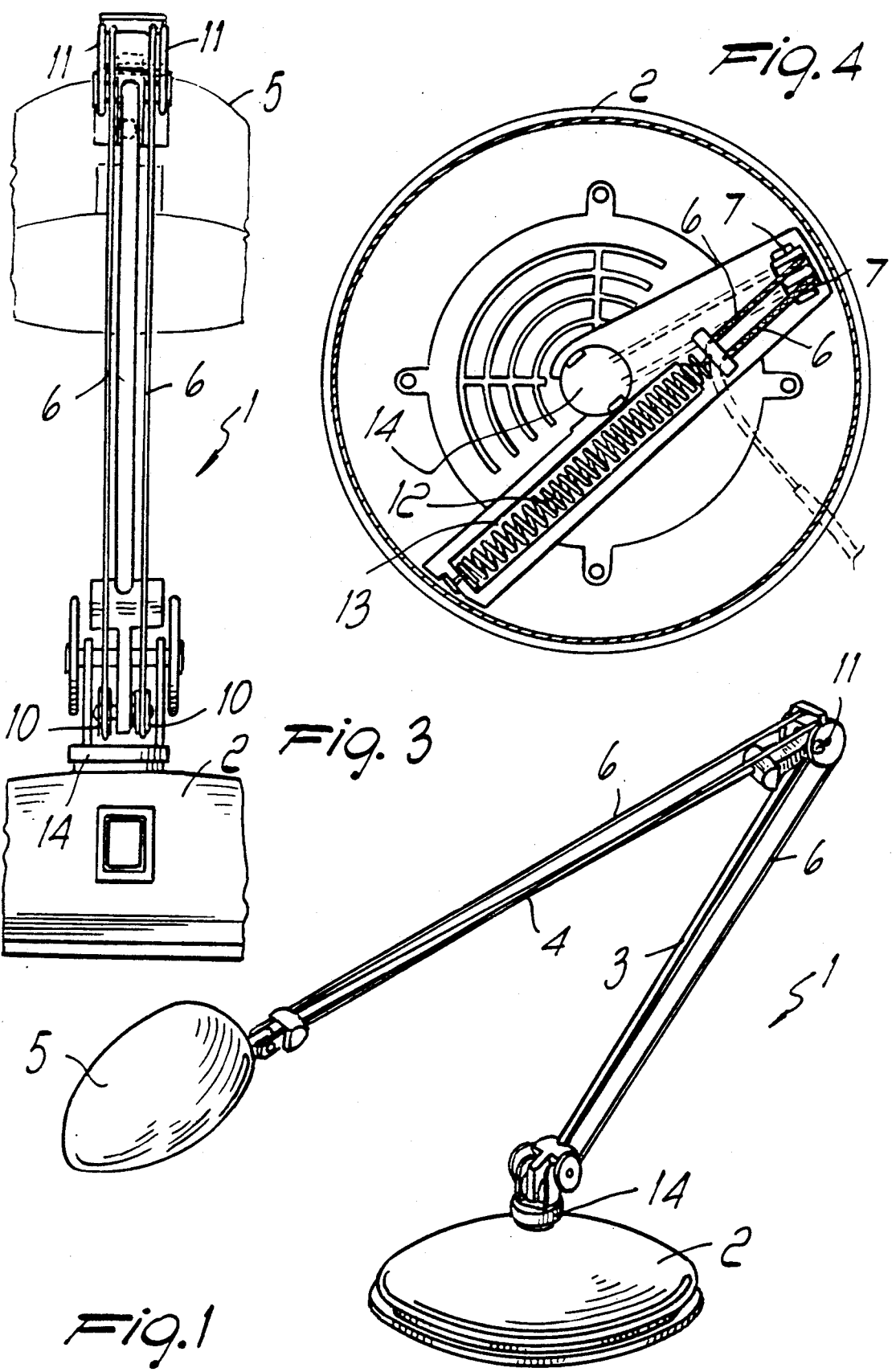

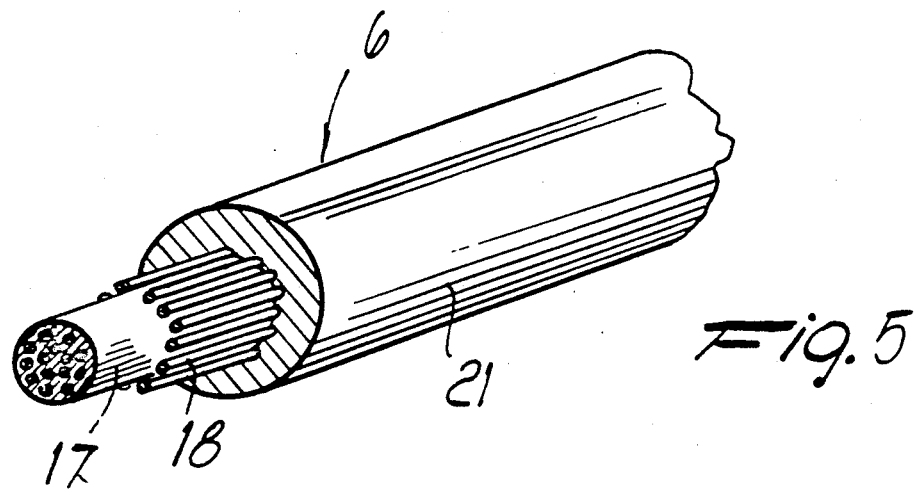
Fig. 5
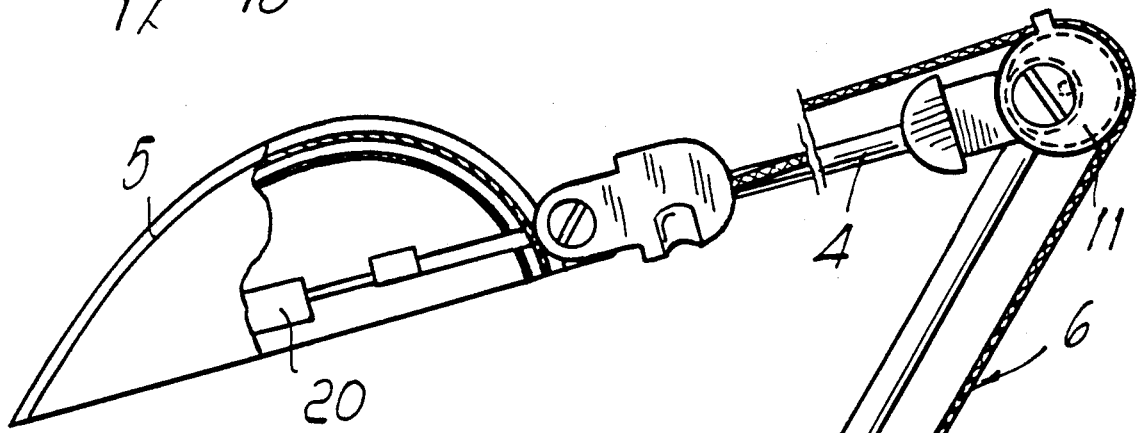
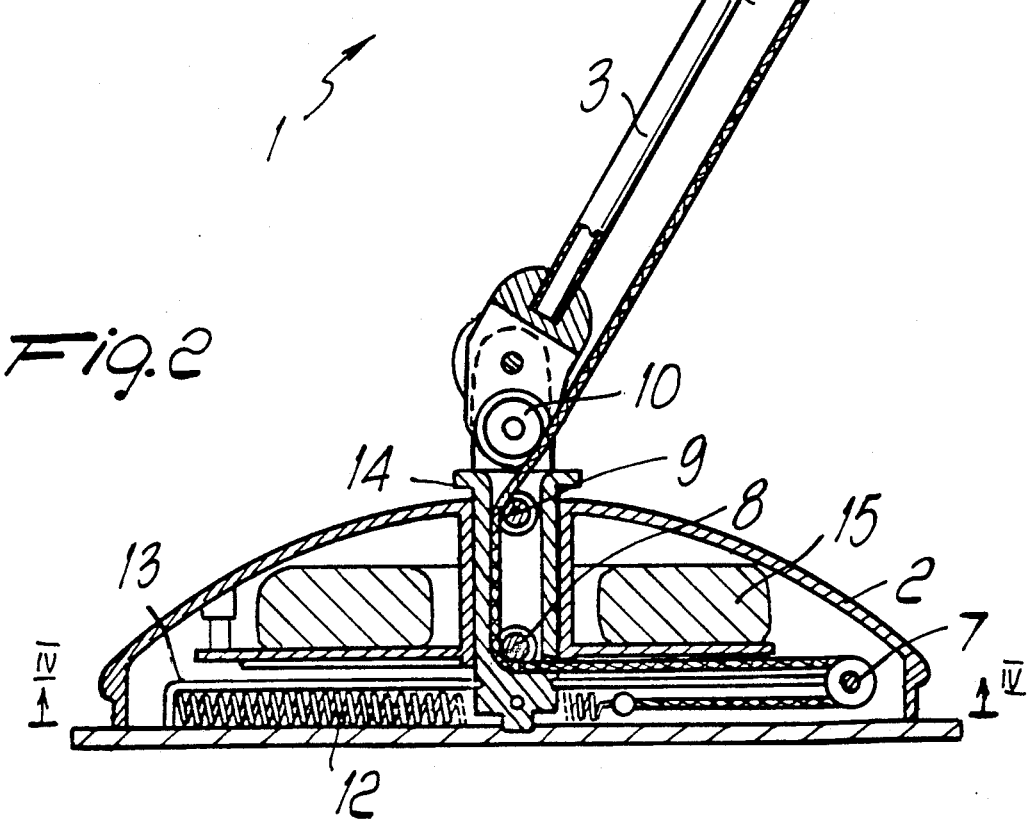
Fig. 2

ARTICULATED ARM LAMP

BACKGROUND OF THE INVENTION

The present invention relates to an articulated arm lamp.

As is known, current lamps with articulated arms have an electric cable which has the purpose of conducting electric current from the base of said lamps, in which the switch and any transformer are usually accommodated, to the light source, and more precisely to a light bulb, which is usually accommodated in a paraboloid adapted to direct the light rays towards an underlying area.

Mostly for aesthetic reasons, the electric cable is usually passed inside the articulated arms, which are hollow, so that the cable is subject, after a more or less long period of use of the lamp, to fraying or indeed to breakage, with consequent danger for the user.

Furthermore, known lamps provide various technical solutions in order to allow orientation of the articulated arms with respect to one another and of both arms with respect to their supporting base; the most frequently used solution is to apply friction devices at the articulation regions; however, such device must be frequently adjusted in order to be always efficient, and despite this they do not ensure the stable retention of the arms in a position chosen by the user, especially in particular positions thereof.

SUMMARY OF THE INVENTION

The aim of the present invention is to eliminate the disadvantages described above by providing an articulated arm lamp which solves the drawbacks shown by the prior art lamps.

Within this aim, an important object of the invention is to provide an articulated arm lamp which allows to keep the articulated arms in a preset position without having to use friction devices for this purpose.

A further object of the invention is to provide an articulated arm lamp which has an extremely simple structure, though it allows to obtain a more stable positioning with respect to conventional lamps.

Not least object of the invention is to provide an articulated arm lamp in which elements for retaining said arms and for conducting current to the light source are in view and are furthermore not subject to wear so that they cause no possible danger for the user.

This aim, as well as these and other objects, are achieved by an articulated arm lamp, as defined in the appended claims.

BRIEF DESCRIPTION OF THE DRAWINGS

The characteristics and advantages of the invention will become apparent from the description of a preferred but not exclusive embodiment of the articulated arm lamp according to the invention, illustrated only by way of nonlimitative example in the accompanying drawings, wherein:

FIG. 1 is a perspective view of the lamp according to the invention;

FIG. 2 is a partially sectional lateral elevation view of the lamp illustrated in FIG. 1, according to the invention;

FIG. 3 is a partial schematic rear elevation view of the lamp according to the invention;

FIG. 4 is a sectional view taken along the line IV—IV of FIG. 2 according to the invention; and FIG. 5 is a partial schematic perspective view of the flexible element adapted to retain the articulated arms and simultaneously conduct electric current from the base to the light source of the lamp according to the invention.

DESCRIPTION OF THE PREFERRED EMBODIMENTS

With reference to the above described figures, the articulated arm lamp according to the invention, generally indicated by the reference numeral 1, comprises a base 2 for supporting a first and a second arm; said arms are mutually articulated and are respectively indicated at 3 and 4.

The second arm 4 furthermore has, at its free end, a paraboloid 5 inside which a light source, such as for example a known light bulb 20, is accommodated.

The first and second arms 3 and 4 are supported by at least one flexible element provided on the lamp, and more precisely by two flexible elements 6 which are furthermore intended to conduct electric current from the base 2 to the light source.

More precisely, as clearly illustrated in FIG. 5, each flexible element 6 comprises a core 17 made of carbon fiber and more in particular of a material characterized by the trademark "Kevlar".

The carbon fiber core 17 is furthermore wound in a strand of copper, generally indicated at 18, which is covered by a polyurethane sheath 21 which gives high abrasion resistance and high traction resistance to the flexible element 6.

The lamp furthermore has guiding elements for the flexible element; more precisely, said guiding elements comprise pulleys indicated at 7, 8, 9, 10 and 11 to allow the movement of the flexible element in contrast with and by virtue of elastic means, more precisely a spring 12, when the arms 3 and 4 are adjusted according to the requirements of the user.

More precisely, the spring 12 is advantageously accommodated in an elongated seat 13 rigidly associated with a pivot 14 which, besides rotatably engaging the base 2 of the lamp, supports the first arm 3 so that the rotation of said arm about its pivoting axis also allows the rotation of the spring 12 together with its accommodation seat 13 so as to cause no entanglement of the flexible elements 6.

At least one of the guiding elements, and more precisely the pulleys indicated at 11, are eccentrically connected in the articulation region between the first and the second arm. Thereby the balance of the lamp is automatically ensured, with no need for friction devices around the rotation axes of the arms, as the position of the arms varies and as the moments caused by the weight of the paraboloid 5 together with the weight of the arms consequently vary. Balance is also ensured by virtue of the flexible elements being in contact with the pulleys 11 in their portion which is spaced furthest from their pivoting axis, indicated at 11a in FIG. 1.

The ends of the flexible elements 6 are respectively associated both with the paraboloid 5 and, on the opposite side, with the spring 12; as already mentioned, by virtue of the fact that the pulleys 7 are rigidly associated with the accommodation seat 13 of the spring 12 and that the pulleys 8 and 9 are rotatably associated with the pivot 14, the entire tensioning assembly of the flexible elements 6 together with the first arm 3 may rotate, without moving the base 2 and the transformer 15 rigidly associated therewith.

The operation of the lamp according to the invention is evident from what has been described and illustrated; in particular it can be seen that the two articulated arms 3 and 4 may rotate about the axis defined by the pivot 14 which is rotatably associated with the base 2.

The orientation of the first and second arms 3 and 4 is furthermore allowed by virtue of the flexible elements 6 which, besides performing the above described function, also advantageously conduct electric current from the base 2 to the light source accommodated inside the paraboloid 5.

Finally, by virtue of the presence of the pulleys 11, which are eccentrically associated in the articulation region between first and second arms, it is possible to automatically ensure the balance of the lamp without the aid of friction devices around the rotation axes of the arms.

The invention thus conceived is susceptible to numerous modifications and variations, all of which are within the scope of the inventive concept; all the details may furthermore be replaced by technically equivalent elements.

For example, according to a different embodiment, each flexible element 6 may be constituted by steel wires with an exclusively mechanical supporting function, while the electric current is conducted by means of ordinary cables arranged inside the structure.

In practice, the materials employed, as well as the dimensions, may be any according to the requirements and to the state of the art.

What is claimed:

1. An articulated arm lamp comprising:
   at least one base;
   articulated arm means;
   at least one portion defined by said articulated arm means and being connected to said base;
   at least another portion defined by said articulated arm means;
   at least one light source connected to said other portion of said articulated arm means;
   positioning means including a flexible support element connected to said base, said articulated arm means and said light source for positioning said articulated arms means and said light source with respect to said base and constituting an electrical conductor means adapted for electrically connecting said light source to a source of electrical energy.

2. Articulated arm lamp according to claim 1, wherein
   said flexible element comprises at least one core, a plurality of electrically conductive strands, and at least one sheath covering said core and said electrically conductive strands.

3. Articulated arm lamp according to claim 2, wherein said core is made of carbon fiber.

4. Articulated arm lamp according to claim 2, wherein said electrically conductive strands are made of copper.

5. Articulated arm lamp according to claim 2, wherein said sheath is made of polyurethane.

6. An articulated arm lamp comprising:
   at least one base;
   articulated arm means;
   at least one end defined by said articulated arm means and being connected to said base;
   at least one portion defined by said articulated arm means;
   at least one light source connected to said portion of said articulated arm means;
   positioning means including a flexible support element connected to said base, said articulated arm means and said light source for positioning said articulated arms means and said light source with respect to said base and constituting an electrical conductor means adapted for electrically connecting said light source to a source of electrical energy.

7. Articulated arm lamp according to claim 6, wherein said element comprises at least one core, a plurality of electrically conductive strands, and at least one sheath covering said core and said electrically conductive strands.

8. Articulated arm lamp according to claim 7, wherein said core is made of carbon fiber.

9. Articulated arm lamp according to claim 7, wherein said electrically conductive strands are made of copper.

10. Articulated arm lamp according to claim 7, wherein said sheath is made of polyurethane.

11. Articulated arm lamp according to claim 6, wherein said element comprises at least one core, a plurality of electrically conductive strands, and at least one sheath covering said core and said electrically conductive strands, wherein said core is a carbon fiber core, said sheath is a polyurethane sheath, and said electrically conductive strands are copper strands, said copper strands being located within said polyurethane sheath around said carbon fiber core.

12. An articulated arm lamp comprising:
    at least one base;
    articulated arm means;
    at least one end defined by said articulated arm means and being connected to said base;
    at least one portion defined by said articulated arm means;
    at least one light source connected to said portion of said articulated arm means; and
    positioning means including a flexible support element connected to said base, said articulated arm means and said light source for positioning said articulated arms means and said light source with respect to said base and constituting an electrical conductor means adapted for electrically connecting said light source to a source of electrical energy; and
    at least one tensioning device for applying tension to said element, whereby said light source is positionable with respect to said articulated arm means and said articulated arm means is positionable with respect to said base.

13. Articulated arm lamp according to claim 12, wherein said positioning element comprises at least one flexible tension element, one core, a plurality of electrically conductive strands, and at least one sheath covering said core and said electrically conductive strands.

14. Articulated arm lamp according to claim 13, wherein said core is made of carbon fiber.

15. Articulated arm lamp according to claim 13, wherein said electrically conductive strands are made of copper.

16. Articulated arm lamp according to claim 13, wherein said sheath is made of polyurethane.

17. Articulated arm lamp according to claim 12, wherein said element comprises at least one core, a plurality of electrically conductive strands, and at least one sheath covering said core and said electrically conductive strands, and wherein said core is a carbon fiber core, said sheath is a polyurethane sheath, and said electrically conductive strands are copper strands, said copper strands being located within said polyurethane sheath around said carbon fiber core.

* * * * *